US012675360B2

(12) United States Patent
Goyal et al.

(10) Patent No.: US 12,675,360 B2
(45) Date of Patent: Jul. 7, 2026

(54) METHOD AND APPARATUS TO AUTO-HEAL MICROSERVICES INFORMATION FLOW BREAKDOWN ACROSS CONTAINERS IN A CLOUD-BASED APPLICATION

(71) Applicant: Bank of America Corporation, Charlotte, NC (US)

(72) Inventors: Shikhu Goyal, Gurugram (IN); Maneesh Sethia, Telangana (IN); Saurabh Garg, Haryana (IN); Shailendra Singh, Maharashta (IN)

(73) Assignee: Bank of America Corporation, Charlotte, NC (US)

( * ) Notice: Subject to any disclaimer, the term of this patent is extended or adjusted under 35 U.S.C. 154(b) by 428 days.

(21) Appl. No.: 18/411,128

(22) Filed: Jan. 12, 2024

(65) Prior Publication Data

US 2025/0232297 A1 Jul. 17, 2025

(51) Int. Cl.
G06F 11/07 (2006.01)

(52) U.S. Cl.
CPC ................................. G06F 11/0793 (2013.01)

(58) Field of Classification Search
CPC ............................ G06F 11/079; G06F 11/0793
See application file for complete search history.

(56) References Cited

U.S. PATENT DOCUMENTS

| | | | |
|---|---|---|---|
| 10,656,929 B2 | 5/2020 | Jamjoom et al. | |
| 11,573,848 B2 * | 2/2023 | Linck ................. | G06F 11/0793 |
| 12,524,214 B1 * | 1/2026 | Liguori ................... | G06F 8/425 |
| 2017/0046146 A1 * | 2/2017 | Jamjoom ................. | G06F 8/62 |
| 2024/0401833 A1 * | 12/2024 | Gavin ...................... | F24F 11/64 |

OTHER PUBLICATIONS

Baqar et al., "Self-Healing Software Systems: Lessons from Nature, Powered by AI" arXiv preprint arXiv: 2504.20093, 2025. (Year: 2025).*
Magableh et al., "A self healing microservices architecture: A case study in docker swarm cluster," International Conference on Advanced Information Networking and Applications. Cham: Springer International Publishing, 2019. (Year: 2019).*
Caballar, Rina Diane, "Generative AI vs. predictive AI: What's the difference?", IBM, 2026 https://www.ibm.com/think/topics/generative-ai-vs-predictive-ai-whats-the-difference#257779833 (Year: 2026).*

* cited by examiner

*Primary Examiner* — Michael Maskulinski
(74) *Attorney, Agent, or Firm* — Weiss & Arons LLP

(57) ABSTRACT

A system and method for auto-healing a microservices information flow across containers in a cloud. A cloud service request may be received in connection with a previous electronic transaction request that was not successfully performed by a cloud-based application. The unsuccessful performance may be related to parameters that were used for the transaction. A generative AI engine may be used to auto-heal the microservices information flow. The auto-healing may include updating one or more parameters associated with the electronic cloud service request. The generative AI engine may update the parameters based on one or more previously used solutions and may perform the updates on the fly. The updated parameters may be application program interface (API) parameters that have been added, deleted, or changed. The requested transaction may be a banking transaction. The transaction may be reprocessed based on the updated parameters.

20 Claims, 8 Drawing Sheets

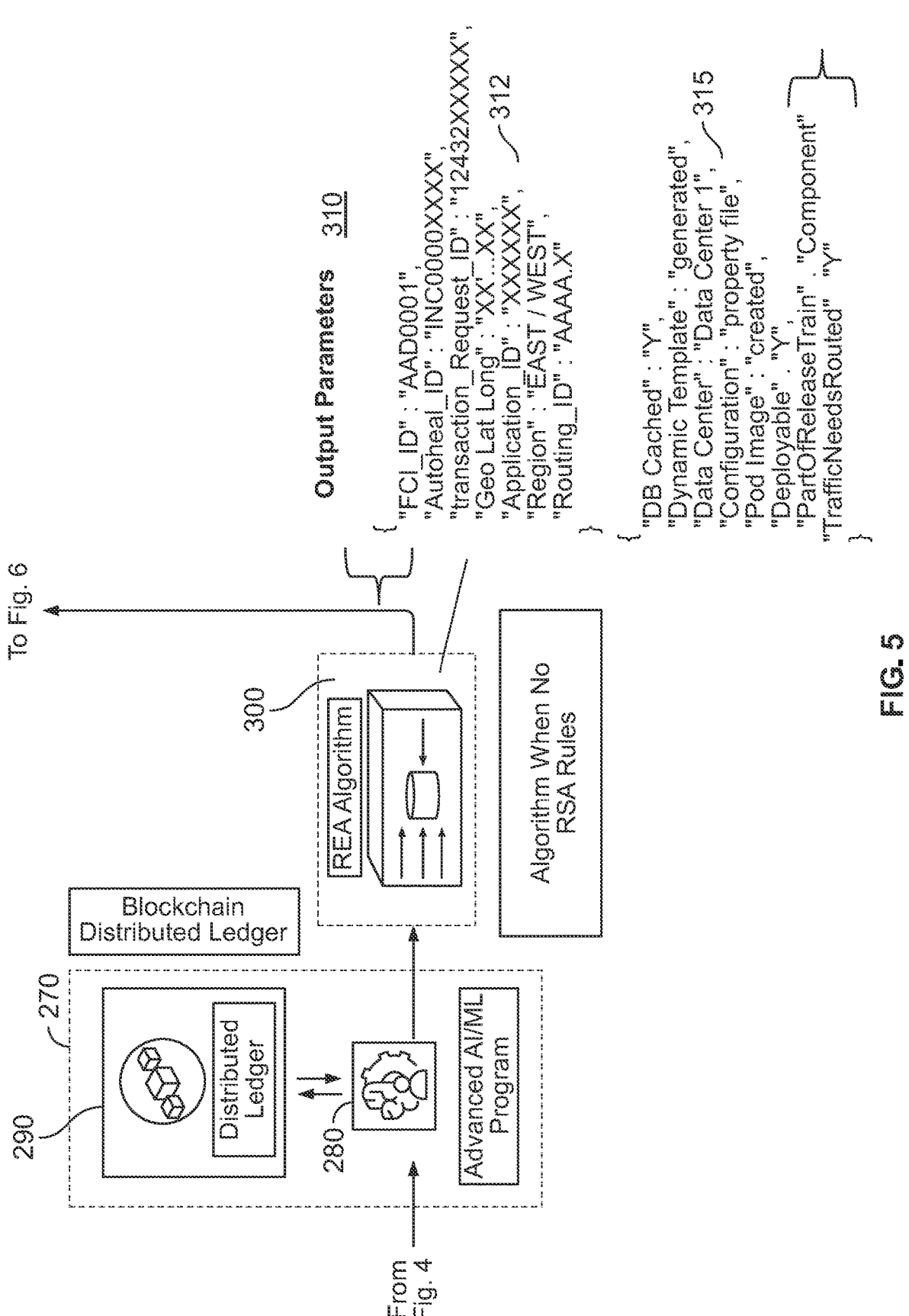

Output Parameters 310

```
{
"FCI_ID" : "AAD0001",
"Autoheal_ID" : "INC0000XXXX",
"transaction_Request_ID" : "12432XXXXX",
"Geo Lat Long" : "XX,..XX",
"Application_ID" : "XXXXXX",
"Region" : "EAST / WEST",
"Routing_ID" : "AAAA.X"                           312
}
```

```
{
"DB Cached" : "Y",
"Dynamic Template" : "generated",
"Data Center" : "Data Center 1",
"Configuration" : "property file",              315
"Pod Image" : "created",
"Deployable" : "Y",
"PartOfReleaseTrain" : "Component"
"TrafficNeedsRouted" : "Y"
}
```

Blockchain
Distributed Ledger

REA Algorithm

Algorithm When No
RSA Rules

Distributed
Ledger

Advanced AI/ML
Program

From
Fig. 4

290   270   280   300

METHOD AND APPARATUS TO AUTO-HEAL MICROSERVICES INFORMATION FLOW BREAKDOWN ACROSS CONTAINERS IN A CLOUD-BASED APPLICATION

FIELD OF THE DISCLOSURE

Aspects of the disclosure relate to autonomous healing (auto-healing) of a microservices information flow breakdown using generative artificial intelligence (AI).

BACKGROUND OF THE DISCLOSURE

Software applications may be hosted on a cloud that performs cloud computing. Multiple instances of the same application may be stored in the same cloud. An application may use microservices available on the cloud to perform different operations of the same application. An application may be encapsulated within one or more containers. Microservices communicate via application program interfaces ("APIs").

Applications performed on the cloud over one or more containers may experience issues related to a breakdown in responses by microservices available over APIs. These issues may relate to uncertain circumstances as well as unavailability of the nodes under the containers for many reasons, such as microservices request failures due to configuration issues, routing challenges due to a network or configuration issue, failures due to large data volumes that outgrow a container's capacity, or a breakdown due to persistent memory storage and data caching problems. The issues may be more challenging where an application is performed over multiple containers.

SUMMARY OF THE DISCLOSURE

It is an object of this invention to provide a system and method for autonomous healing of a breakdown of microservices across one or more containers in a cloud-based environment.

A method of auto-healing a microservices information flow across containers in a cloud may be provided in accordance with the present disclosure. The method may include receiving, at a cloud that provides computing services to a computer, an electronic cloud service request relating to an unsuccessful performance of a first request to perform an electronic transaction. The unsuccessful performance of the first request may have been unsuccessful using a cloud-based application. The cloud-based application may be configured to use microservices in one or more containers. The method, in response to the electronic cloud service request of the unsuccessful performance of the first request, may use a generative AI engine in the cloud to generate a solution to autonomously heal the microservices information flow and enable interaction between the computer and the cloud-based application to perform the electronic transaction. The method may include autonomously healing the microservices information flow to enable performance of the electronic transaction using the generated solution.

The cloud service request may include one or more parameters that have been used in connection with the first request to perform the electronic transaction. The generation of the solution by the generative AI engine may include determining one or more additions, deletions, or changes to the one or more parameters in the first request for the electronic transaction. The method may include instituting the one or more additions, deletions, or changes before initiating a second request to perform the electronic transaction. The one or more added, deleted, or changed parameters may include one or more of configuration parameters, network parameters, container parameters, memory storage parameters or data caching parameters.

The generative AI engine may be configured to determine the one or more parameters to be added, deleted, or changed based on one or more stored predicted solution templates that may have been previously implemented successfully to resolve issues with processing previous problems with the microservices information flow in the cloud. The templates may include records of previous solutions that have been applied to resolve issues with completing request transactions in the cloud.

The generative AI engine may be configured to determine the one or more parameters to be added, deleted, or changed based on a Rules Engine Algorithm (REA) that is maintained on the cloud.

The generative AI engine may be configured to generate, on the fly, a solution that autonomously heals the microservices information flow over the cloud when the generative AI engine is unable to autonomously heal the microservices information flow using the one or more stored predicted solution templates.

The one or more stored predicted solution templates may be obtained from a solutions database that may include data relating to past failed customer interactions and successful solutions to the past failed customer interactions.

Multiple instances of the cloud-based application may be available on the cloud. The multiple instances of the cloud-based application may be stored at two or more different data centers. The method may include storing a predicted solution template for each of the multiple instances of the cloud-based application.

The electronic cloud service request may include a request to perform an electronic banking transaction using the cloud-based application.

The predicted solutions for the application under a container may be stored in a cache associated with the application to be available for future use to generate a future solution to another failed customer interaction associated with the cloud-based application.

The method may include recording a record of each requested transaction for which a predicted solution is required and the predicted solution that was successfully used on a distributed ledger of a blockchain. An entry in the distributed ledger for each respective electronic cloud service request and a corresponding solution for the respective electronic cloud service request may include a first hash of the electronic cloud service request. Entries in the distributed ledger for each respective electronic cloud service request and a corresponding solution for the respective electronic cloud service request may include a second hash of an electronic cloud service response to the electronic cloud service request.

When the electronic cloud service request cannot be performed on a first attempt, the method may transmit the electronic cloud service request to a Lambda Handler located in the cloud to forward the electronic cloud service request to the generative AI engine.

The electronic cloud service request may be processed by a Distributed Denial of Services (DDos) protection service to block fraudulent transactions from being propagated beyond the DDos protection service. The electronic cloud service request may be transmitted through a multi-channel bus after being processed by the DDos protection service.

The multi-channel bus may be configured to operate a prioritization algorithm performed by second computer processor at the multi-channel bus to prioritize an order in which to process transaction requests.

A system in which a cloud-based application may be implemented using microservices in containers may be provided in accordance with principles of the disclosure. The system may include an input to a cloud. The input to a cloud may be configured to receive an electronic cloud service request to perform an electronic transaction relating to an unsuccessful performance of a first request to perform an electronic transaction using a cloud-based application. The cloud-based application may be implemented using microservices in a container. The electronic transaction may not have been completed because of an interruption in the microservices information flow. The system may be configured to include a generative AI engine in the cloud that is configured to autonomously heal a microservices information flow. The autonomous healing may be performed by determining parameters associated with the first request to be added, deleted, or changed when the microservices are unable to perform the first request. The microservices may successfully perform the requested electronic transaction using the added, deleted, or changed parameters. This may enable the microservices to successfully perform the requested electronic transaction. The system may include one or more computer processors in the cloud that may be configured to autonomously heal the microservices information flow and perform the electronic transaction.

The generative AI engine may be configured to perform the requested electronic transaction based on one or more stored predicted solution templates that have been previously used to successfully process other requested electronic transactions. The generative AI engine may be configured to generate, on the fly, a solution that autonomously heals the microservices information flow over the cloud when the generative AI engine is unable to autonomously heal the microservices information flow using only the one or more stored predicted solution templates.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which:

FIG. 5 shows an enlarged view of a fourth portion of the illustrative system of FIG. 1 in accordance with principles of the disclosure.

DETAILED DESCRIPTION OF THE DISCLOSURE

Figure 1:
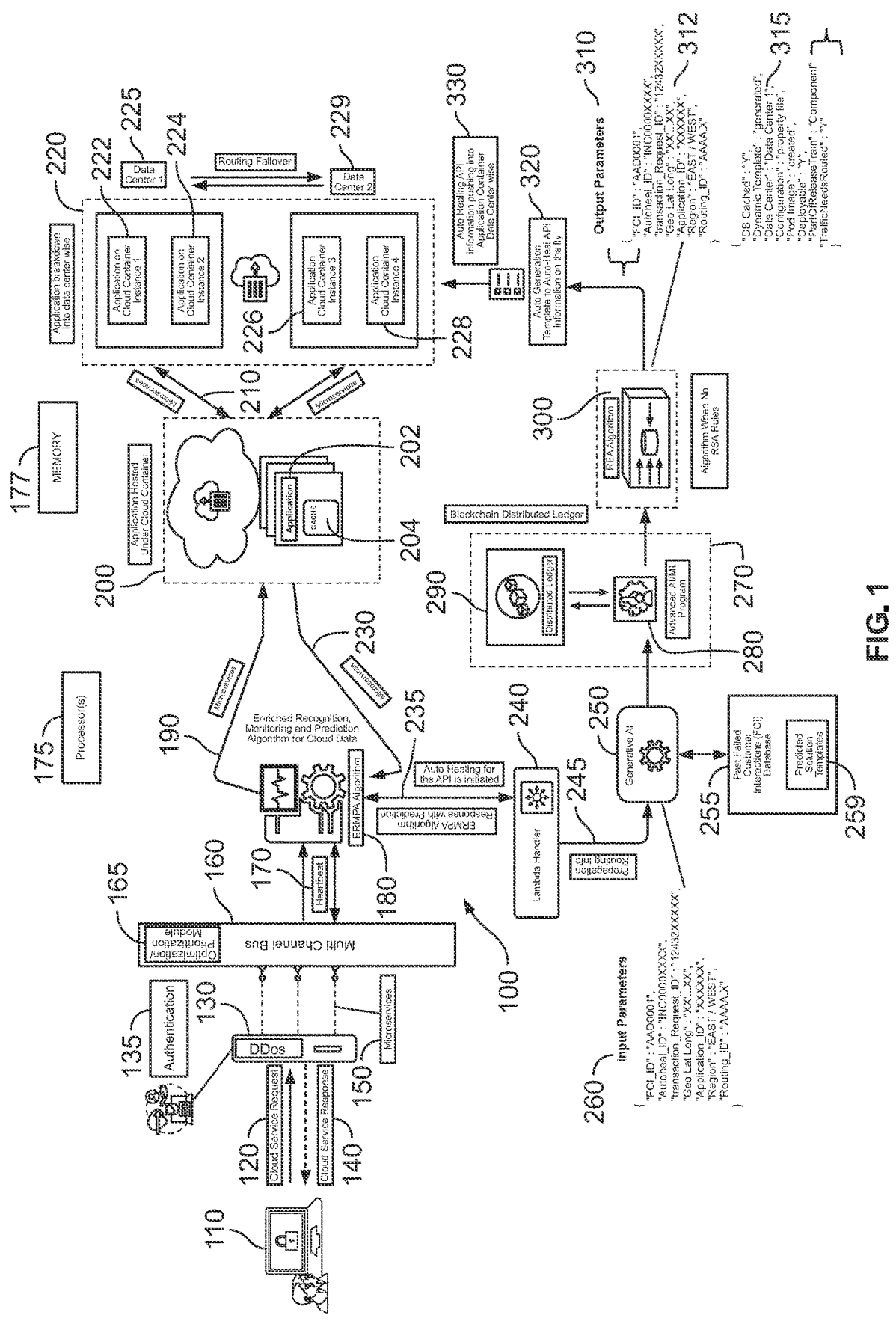
FIG. 1 shows an illustrative system architecture in accordance with principles of the disclosure.
Figure 2:
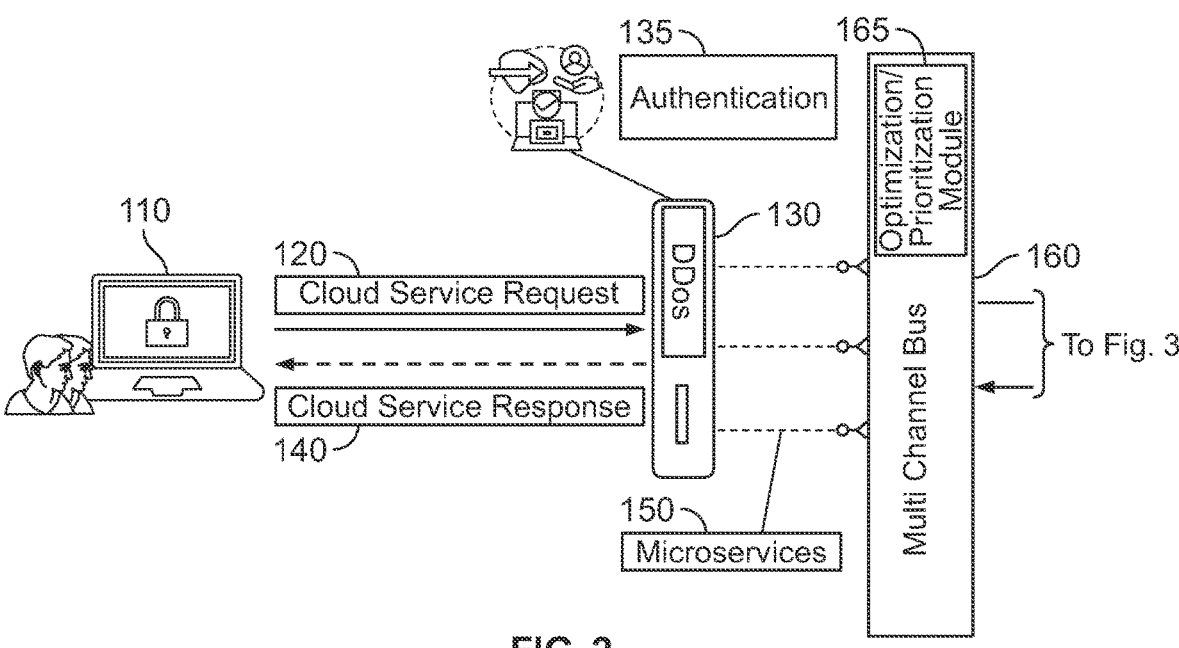
FIG. 2 shows an enlarged view of a first portion of the illustrative system of FIG. 1 in accordance with principles of the disclosure.
Figure 3:
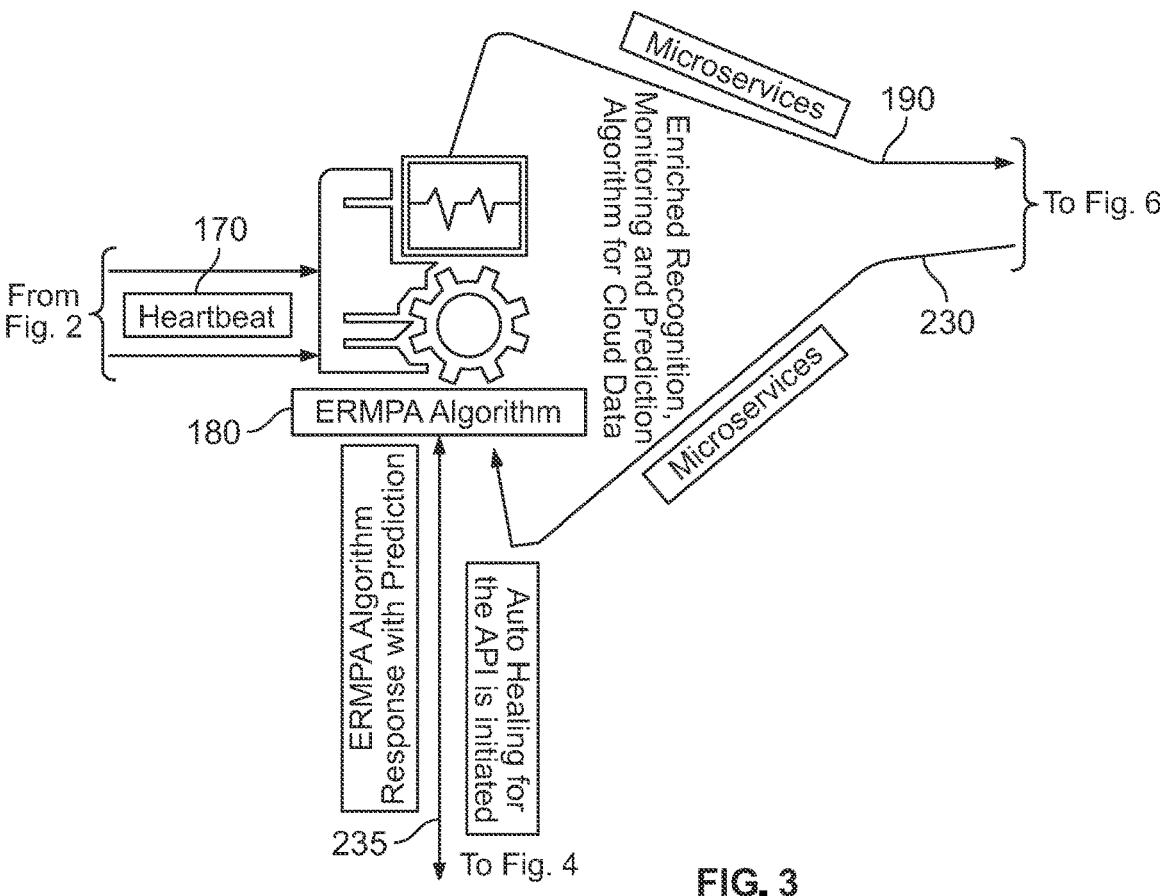
FIG. 3 shows an enlarged view of a second portion of the illustrative system of FIG. 1 in accordance with principles of the disclosure.
Figure 4:
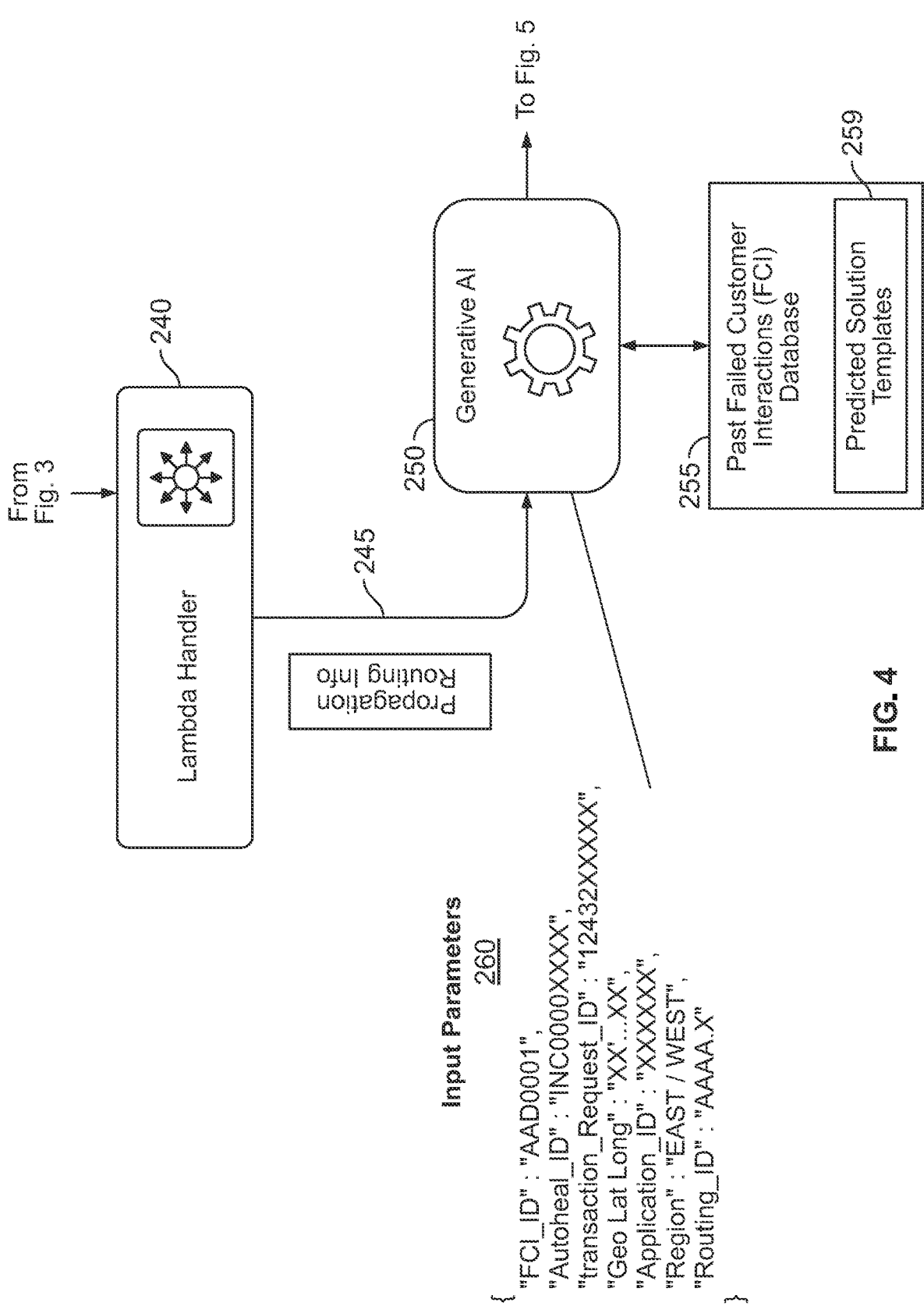
FIG. 4 shows an enlarged view of a third portion of the illustrative system of FIG. 1 in accordance with principles of the disclosure.
Figure 6:
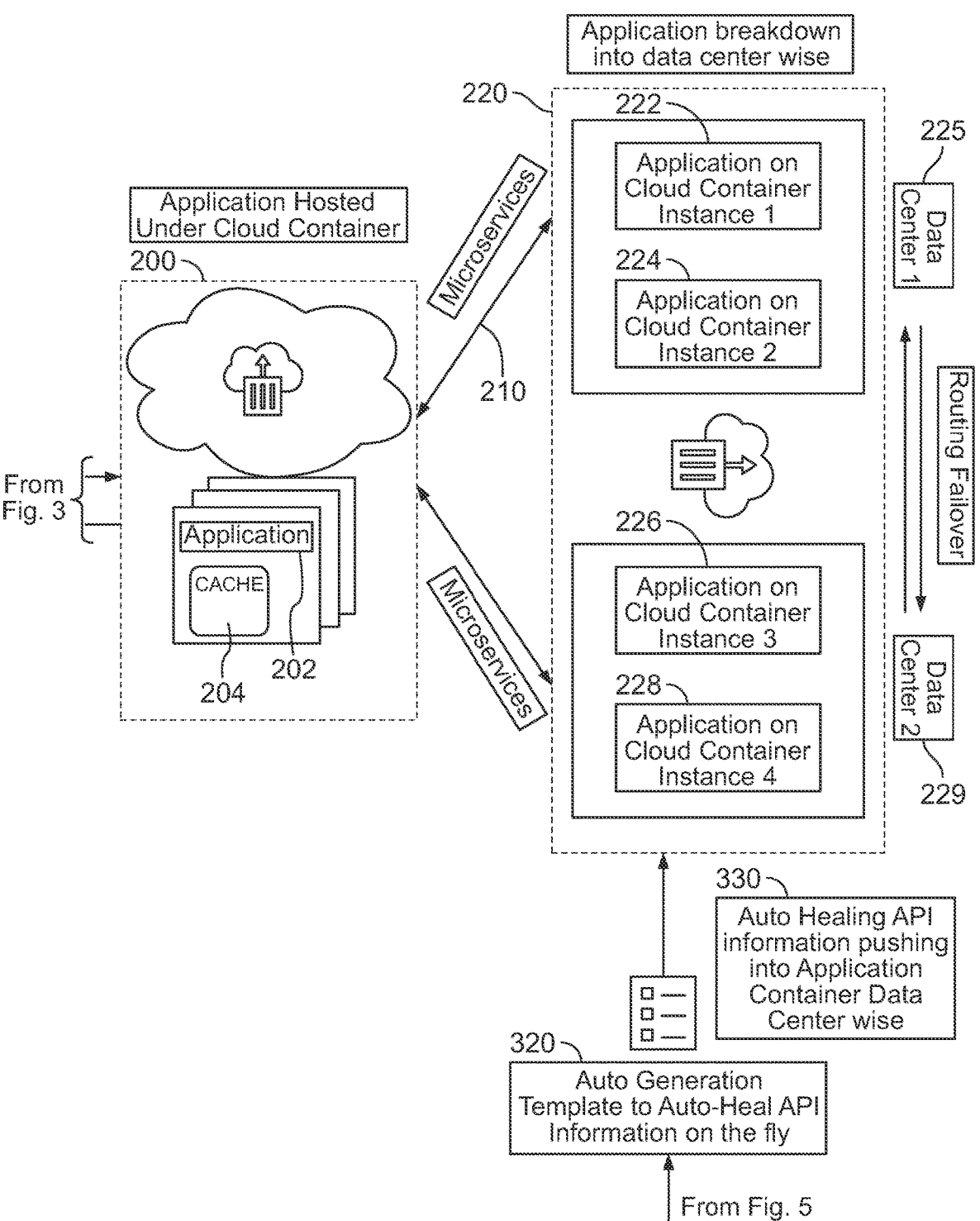
FIG. 6 shows an enlarged view of a fifth portion of the illustrative system of FIG. 1 in accordance with principles of the disclosure.

The present disclosure relates to systems and methods that may be provided for containers to be configured to predict how to auto-heal themselves upon a breakdown in a microservices information flow. The auto-healing may be performed using generative AI. The system may include an interface that may have self-monitoring and predicting capabilities to troubleshoot issues with the containers in the cloud in real-time and to fix the issues without human intervention. Auto-healing may enable the applications on the cloud to run continuously without interruption. Examples of auto-healing may include fixing configuration or issues that may arise, such as due to software or hardware changes on the cloud, cloud resource problems, or computer memory problems.

The cloud may receive a cloud service request from a computer from which the transaction request has been sent. The cloud service request may request assistance with performing an electronic transaction using a cloud-based application, such as a software-as-a-service application. The cloud service request may be automatically generated by the computer or may be generated by a user. The assistance may be needed to deal with a failed customer interaction ("FCI") with the application. The cloud service request may include a request that the error be diagnosed and repaired, or the cloud service request may trigger such a request at the cloud. The cloud service request may include information in the FCI regarding the electronic transaction. The information may include a copy of the electronic transaction request that failed.

Each cloud service request may pass through a Distributed Denial of Services (DDos) protection service to pre-check the cloud service request to determine whether it may be fraudulent. The DDos protection service may be located so as to detect and block any fraudulent request from entering the cloud. All authenticated requests may be transported from the DDOS protection service to the cloud over a multi-channel bus (MCB).

The MCB may pass the cloud service requests to an algorithm in the cloud, which may be termed an Enriched Recognition, Monitoring and Prediction Algorithm (ERMPA). The ERMPA may be configured to recognize the breakdown in the microservices information flow and monitor performance of requested electronic transactions with the cloud-based application and to recognize problems encountered in interacting with the cloud-based application. ERMPA may be further configured to obtain a predicted solution that may work to resolve issues that have identified with electronic transaction requests to enable the user's computer to interact with the cloud-based application. The predicted solution may be based on rules, accessible to the algorithm, for handling incoming requests. The solution may be predicted separately for separate instances of an application, such as where an application is implemented, for example, at different data centers. A solution may be predicted by ERMPA for every incoming cloud service request.

Where a predicted solution is needed, the ERMPA algorithm may transmit a request to an event handler, such as a Lambda Handler, to arrange for a generative AI engine to generate a solution. The Lambda Handler, a serverless computer platform provided by Amazon Web Services, may process multiple requests in parallel.

The generative AI engine may use one or more solution templates to auto heal the containers that are experiencing problems so that the microservices operate correctly. The solution templates may be based on solutions previously used successfully to resolve failed customer interactions (FCI). The solution templates may be stored in a database. The generative AI engine may use a Rules Engine Algorithm (REA) that may include rules for generating a solution. In instances where the REA does not provide a set of rules for generating a solution template, the generative AI engine may be used to generate, on the fly, a solution for auto-healing using an AI/ML algorithm.

A Distributed Ledger technology may be used to track details relating to each cloud service request and associated response. The requests and associated responses may be tracked by generating and storing in a message digest a hash value of the request along with a hash value of the generated response.

Failed Customer Interaction (FCI's) may be processed through the MCB using a message packet with all of the required parameters that include the details that may be needed to reprocess the previously failed transaction request upon auto-healing.

Applications may be maintained under the container with a cache to predict a faster result relating to a request and to create an auto-generated template that may be stored for the generative AI engine to resolve future issues.

Illustrative embodiments of methods, systems, and apparatus in accordance with the principles of the invention will now be described with reference to the accompanying drawings, which form a part hereof. It is to be understood that other embodiments may be used, and structural, functional, and procedural modifications may be made without departing from the scope and spirit of the present invention.

The drawings show illustrative features of methods, systems, and apparatus in accordance with the principles of the invention. The features are illustrated in the context of selected embodiments. It will be understood that features shown in connection with one of the embodiments may be practiced in accordance with the principles of the invention along with features shown in connection with another of the embodiments.

The methods, apparatus, computer program products, and systems described herein are illustrative and may involve some or all the steps of the illustrative methods and/or some or all of the features of the illustrative system or apparatus. The steps of the methods may be performed in an order other than the order shown or described herein. Some embodiments may omit steps shown or described in connection with the illustrative methods. Some embodiments may include steps that are not shown or described in connection with the illustrative methods, but rather are shown or described in a different portion of the specification.

FIG. 1 shows an illustrative system architecture in accordance with principles of the disclosure. FIGS. 2 to 6 show enlarged portions of the illustrative system shown in FIG. 1.

As shown in FIG. 1, a system may be provided to auto-heal a flow of microservices that are used by an application in a container on a cloud 100.

A user using computer 110 may attempt to access a cloud-based application to perform a transaction. In embodiments, the user may be a customer of an application provider that provides the cloud-based application. In embodiments, the user may be the provider of the cloud-based application. The application may be accessible by the user. The application may be, for example, a banking application and the transaction that is requested may be, for example, a banking transaction.

The cloud-based application may not work for the user and may result in a failed interaction, or failed customer interaction (FCI) where the user is a customer of the application provider. Issues with the applications hosted on the cloud over multiple containers may be related to a breakdown in microservices responses due to uncertain circumstances. Nodes under containers may be unavailable for various reasons, such as microservices request failures due to configuration issues, routing challenges due to a network or configuration issue, a failure due to large data volumes that may outgrow a container's capacity, or a breakdown due to persistent memory storage and data caching. Some issues may arise due to incorrect parameter settings, such as incorrect application program interface (API) settings.

When an electronic transaction is not performed as requested, a cloud service request 120 may be sent from computer 110 to the cloud to request resolution of an issue with a non-working application. A user may manually send the cloud service request, or it may be sent automatically from computer 110. A Distributed Denial of Services (DDos) protection service 130 may be used to block cloud service requests that may request fraudulent transactions from being propagated beyond the DDos protection service 130. Cloud service responses 140, including a service response to computer 110, may also pass in the opposite direction from the cloud to computer 110. The cloud service responses 140 may also pass through DDos 130 to check for and block any fraudulent responses.

After passing through DDos protection service 130, cloud service requests 120 may be forwarded as microservices 150 to a multi-channel bus (MCB) 160. MCB 160 may receive multiple requests in parallel. Because many requests may be received in parallel at the same time, bus 160 may include an optimization/prioritization module 165 that may optimize the processing of the requests and prioritize certain requests over other requests.

Cloud 100 may include one or more processors 175 to execute operations and memory 177 to store data as needed.

After passing through MCB 160, service requests may be forwarded to an algorithm 180, for example an ERMPA algorithm, that may be configured to auto-heal microservices that may be causing the failed customer interactions. Algorithm 180 may maintain a continuous connection with MCB 160 by exchanging a heartbeat 170. Algorithm 180 may provide enriched recognition, monitoring and prediction for the cloud data.

Cloud service requests may be forwarded by ERMPA algorithm 180 for troubleshooting. The troubleshooting may include transmitting a request for executing the application as microservices over link 190. The application may be hosted under a cloud container 200. The container may include applications, including an application 202 and may include a cache 204 for application 202. Cache 204 may store parameters locally for quicker execution of the application. The system may attempt to execute application 202 one or more times to confirm that there is still a problem performing the requested transaction. These attempts may be performed before solutions to service failures using generative AI are attempted. An attempt to execute the application may be made after a solution has been generated and applied to check whether the applied solution has worked or if a different solution should be tried.

Application 200 may be executed using one or more of multiple instances of application 200 that may be resident on cloud 100. Communications between application 200 under container and instances of application 200 may be communicated over link 210. For example, there may be four instances of application 200 available, including instances 222, 224, 226 and 228. Some instances 222, 224 of application 200 may be resident at a first data center, such as Data Center 1. Other instances 226, 228 of application 200 may be resident at a second data center, such as Data Center 2. The instances of application may differ. For example, there may be instances of the application that are stored in a data center that has a configuration different from a configuration of another data center. Multiple instances of application 200 may be tested to check whether one of the instances will work. Results may be returned to ERMPA algorithm 180 over links 210 and 230.

ERMPA algorithm 180 may attempt to auto-heal issues that may be recognized. The fixes may relate, for example, to changes in parameters that may be needed to access an application that is implemented on the cloud. The parameters that are to be changed may be API parameters. When a problem with a transaction request to an application is confirmed, a request to auto-heal and interact with the application so that a transaction may be successfully completed may be sent to Lambda Handler 240. Lambda Handler may forward the request to a relevant pathway for resolution. The request may be sent along with a prediction analysis, if any, as to what the issue might be. Lambda Handler 240 may propagate routing information at 245 to route the problem to a generative AI engine 250.

Generative AI engine 250 may receive input parameters 260 from ERMPA algorithm 180. Input parameters 260 may include parameters that may associate the message with an application and may be used to search for a response that may assist in auto-healing. Input parameters 260 may be stored in a message digest. Input parameters 260 may include, for example, parameters such as an identifier of a failed customer information FCI_ID, an auto-heal identifier ID Autoheal_ID, a transaction request identifier transaction_Request_ID that may correspond to a transaction that has been requested but was unable to be performed, geolocation information Geo Lat Long that may include a geolocation (including latitude and longitude) of where the transaction request originated, an application identifier Application_ID of the application that is to be used to execute the transaction, Region information, such as East or West Coast of the United States, in which the transaction originated, and a routing identifier Routing_ID that provides routing information for the auto-healing request from ERMPA algorithm 180.

Generative AI engine 250 may have access to a database 255 of past failed customer interactions and solutions. Database 255 may include one or more predicted solution templates that may have been used in the past to resolve the same or similar problems encountered with the microservices information flow. Generative AI engine 250 may interact with database 255 to determine whether database 255 includes a solution template that may be used to predict a solution to the problem encountered by the application. A relevant solution template may be, for example, a solution that may have been associated with non-performance of a similar requested transaction or cloud-based application and may include a solution that was successful to enable performance of the requested transaction. The predictor may be tested by generative AI engine 250. In some embodiments, the problem may be considered to be resolved where one or more of the application instances become functional to successfully process a transaction request. In some embodiments, the problem may be considered to be resolved when multiple instances of the application functional to successfully process the transaction request. When the application is successfully executed, cloud service response 140 may be sent to the user who reported the event to indicate that the problem has been solved. The event and its details, including may be recorded on a blockchain in distributed ledger 290. Different instances of application 200 may require different solutions to respond to a transaction request from the user.

A rules engine algorithm (REA) 300 may be used to determine how to apply the solution identified based on predictors in database 255 to address fixes and changes that may be needed to address the problems that have been identified. The REA algorithm may receive a message digest with parameters to search for a related request and to provide the response.

At times, there may not be predictor in database 255 for certain situations that arise. In those cases, new solutions for which no predicted solution is available, solution templates may be needed to auto-heal the microservices information flow. Generative AI engine 250 may be configured to resolve those situations on the fly at 300 using ML/AI by generating auto-heal API information on the fly. For example, generative AI engine 250 may consider all information available to it including, for example, information in database 255, rules specified in REA algorithm, 300, but also other information that are determined by generative AI engine 250, such as which data center to use, parameters needed for the cloud, and application settings. The auto-healing API information at 330 may be pushed to each data center and each application container to enable the original electronic transaction request to work. The solutions that are generated on the fly may also be stored on the blockchain in distributed ledger 290 for possible future reference by ERMPA algorithm 180.

An example of parameters that may be output as a solution from generative AI engine 250 based on input parameters 260 may include output parameters 310. Output parameters 310 may include parameters 312 that correspond to input parameters 260 and may include additional parameters 315 that have been generated for use in auto-healing API information. Additional parameters 315 may include a flag that indicates whether a database is cached DB_Cached, whether a dynamic template is generated, the data center in which an instance of an application that works is stored, an indicator whether a Pod (Print on Demand) Image has been created, an indicator as to whether the solution is deployable, an indicator as to what part of a release train the solution may be (where a release train is an incremental series of steps for upgrading software), and an indicator whether traffic needs to be routed.

Figure 7:
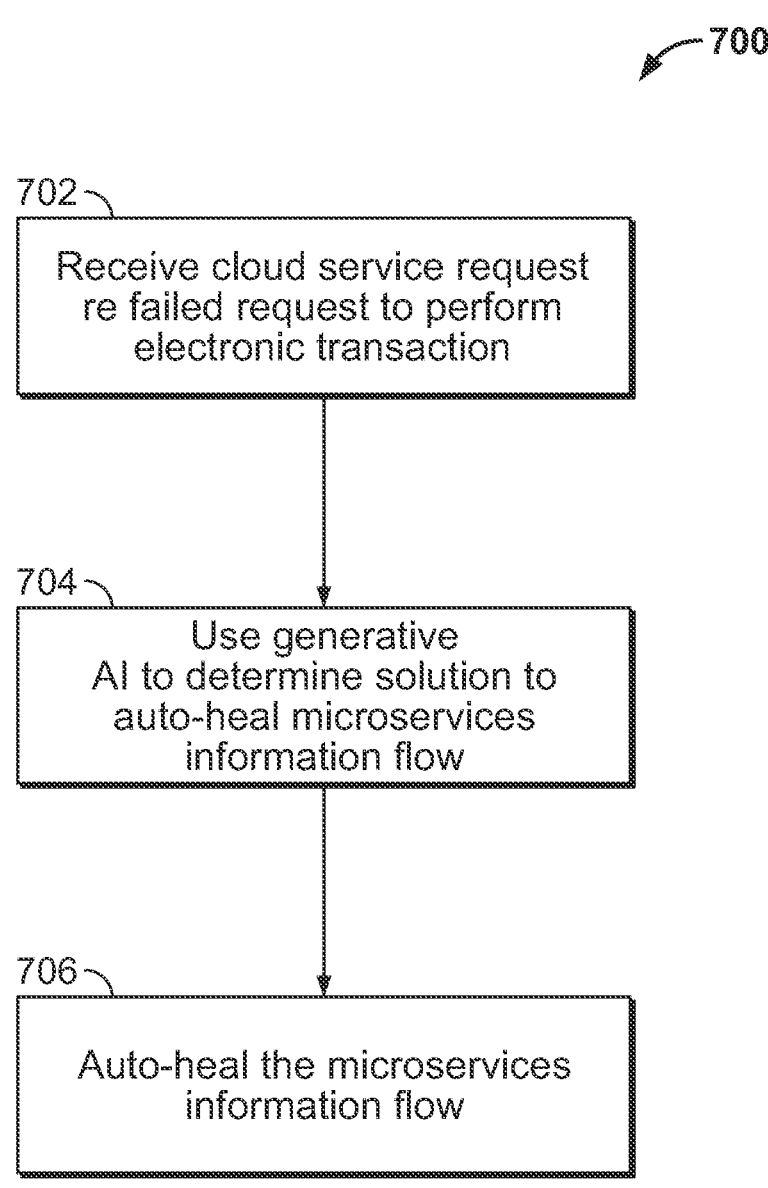
FIG. 7 shows an illustrative example of a flow chart of an auto-healing method for generating missing microservice information that may be performed in accordance with principles of the disclosure.

FIG. 7 shows an illustrative example of a flow chart 700 of an auto-healing method for generating missing microservice information that may be performed in accordance with principles of the disclosure. At step 702, the system may receive from a user a cloud service request for resolving a failed customer interaction with a cloud-based application. The failed customer interaction may result, for example, when a computer sends a request for an electronic transaction that was not successfully performed using the cloud-based application. The transaction request may include API information for performing the transaction. However, the API information may not work, such as because the API information may be incorrect. The cloud service request may be input to the system and the cloud-based application may be implemented using microservices in a container. The requested customer transaction may have been previously attempted but may have not been successfully performed by the cloud-based application.

At step 704, in response to the electronic cloud service request, the generative AI engine may generate a solution to autonomously heal the microservices information flow and enable interaction between the computer and the cloud-based application to perform the electronic transaction. The generative AI engine may engine add, remove, or change one or more parameters associated with the electronic cloud service request so that the microservices are capable of successfully performing the electronic transaction using one or more added or changed parameters.

At step 706, the microservices information flow may be autonomously healed using the generated solution.

The steps may be performed using one or more processors in the cloud and other cloud resources.

Figure 8:
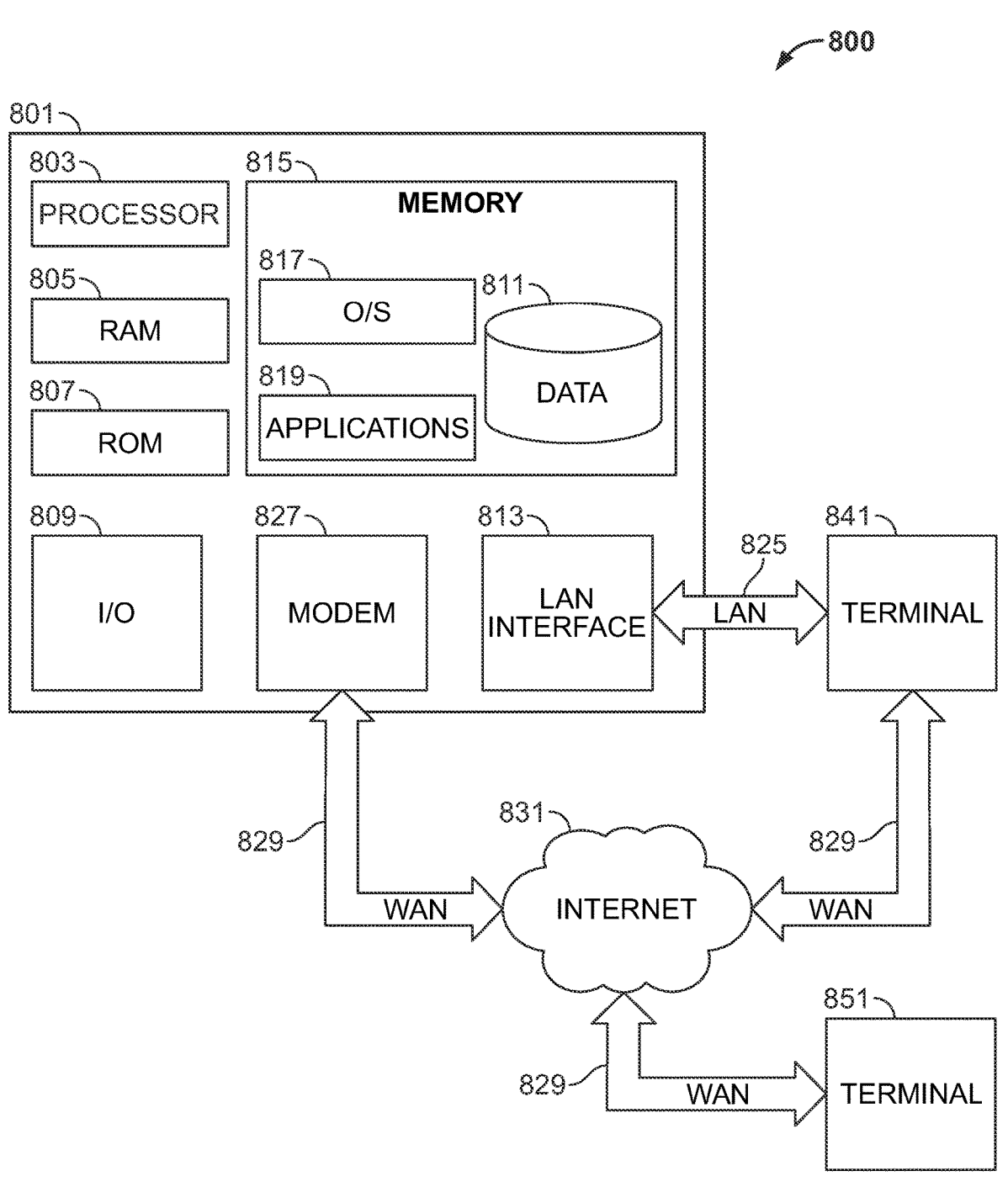
FIG. 8 shows an illustrative system architecture in accordance with principles of the disclosure.

FIG. 8 shows an illustrative block diagram of system 800 that includes computer 801. Computer 801 may alternatively be referred to herein as an "engine," "server" or a "computing device." Computer 801 may be any computing device described herein, such as the computing devices running on a computer, smart phones, smart cars, smart cards, and any other mobile device described herein. Elements of system 800, including computer 801, may be used to implement various aspects of the systems and methods disclosed herein. Examples of system 800 may include cloud 100 and computer 110.

Computer 801 may have a processor 803 for controlling the operation of the device and its associated components, and may include RAM 805, ROM 807, input/output circuit 809, and a non-transitory or non-volatile memory 815. Machine-readable memory may be configured to store information in machine-readable data structures. Other components commonly used for computers, such as EEPROM or Flash memory or any other suitable components, may also be part of the computer 801.

Memory 815 may be comprised of any suitable permanent storage technology—e.g., a hard drive. Memory 815 may store software including the operating system 817 and application(s) 819 along with any data 811 needed for the operation of computer 801. Memory 815 may also store videos, text, and/or audio assistance files. The data stored in Memory 815 may also be stored in cache memory, or any other suitable memory.

Input/output ("I/O") module 809 may include connectivity to a microphone, keyboard, touch screen, mouse, and/or stylus through which input may be provided into computer 801. The input may include input relating to cursor movement. The input/output module may also include one or more speakers for providing audio output and a video display device for providing textual, audio, audiovisual, and/or graphical output. The input and output may be related to computer application functionality.

Computer 801 may be connected to other systems via a local area network (LAN) interface 813. Computer 801 may operate in a networked environment supporting connections to one or more remote computers, such as terminals 841 and 851. Terminals 841 and 851 may be personal computers or servers that include many or all the elements described above relative to computer 801.

In some embodiments, computer 801 and/or Terminals 841 and 851 may be any of mobile devices that may be in electronic communication with consumer device 806 via LAN, WAN, or any other suitable short-range communication when a network connection may not be established.

When used in a LAN networking environment, computer 801 is connected to LAN 825 through a LAN interface 813 or an adapter. When used in a WAN networking environment, computer 801 may include a communications device, such as modem 827 or other means, for establishing communications over WAN 829, such as Internet 831.

In some embodiments, computer 801 may be connected to one or more other systems via a short-range communication network (not shown). In these embodiments, computer 801 may communicate with one or more other terminals 841 and 851, such as the mobile devices described herein etc., using a personal area network (PAN) such as Bluetooth®, NFC (Near Field Communication), ZigBee, or any other suitable personal area network.

It will be appreciated that the network connections shown are illustrative and other means of establishing a communications link between computers may be used. The existence of various well-known protocols such as TCP/IP, Ethernet, NFT, HTTP, and the like is presumed, and the system can be operated in a client-server configuration to permit retrieval of data from a web-based server or API (Application Programming Interface). Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Additionally, application program(s) 819, which may be used by computer 801, may include computer executable instructions for invoking functionality related to communication, such as e-mail, Short Message Service (SMS), and voice input and speech recognition applications. Application program(s) 819 (which may be alternatively referred to herein as "plugins," "applications," or "apps") may include computer executable instructions for invoking functionality related to performing various tasks. Application programs 819 may use one or more algorithms that process received executable instructions, perform power management routines or other suitable tasks.

Application program(s) 819 may include computer executable instructions (alternatively referred to as "programs"). The computer executable instructions may be embodied in hardware or firmware (not shown). The computer 801 may execute the instructions embodied by the application program(s) 819 to perform various functions.

Application program(s) 819 may use the computer-executable instructions executed by a processor. Generally, programs include routines, programs, objects, components, data structures, etc. that perform particular tasks or implement particular abstract data types. A computing system may be operational with distributed computing environments where tasks are performed by remote processing devices that are linked through a communications network. In a distributed computing environment, a program may be located in both local and remote computer storage media including memory storage devices. Computing systems may rely on a network of remote servers hosted on the Internet to store, manage, and process data (e.g., "cloud computing" and/or "fog computing").

One or more of applications 819 may include one or more algorithms that may be used to implement features of the disclosure.

The invention may be described in the context of computer-executable instructions, such as applications 819, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. It should be noted that such programs may be considered, for the purposes of this application, as engines with respect to the performance of the particular tasks to which the programs are assigned.

Computer 801 and/or terminals 841 and 851 may also include various other components, such as a battery, speaker, and/or antennas (not shown). Components of computer system 801 may be linked by a system bus, wirelessly or by other suitable interconnections. Components of computer system 801 may be present on one or more circuit boards. In some embodiments, the components may be integrated into a single chip. The chip may be silicon-based.

Terminal 851 and/or terminal 841 may be portable devices such as a laptop, cell phone, Blackberry™, tablet, smartphone, or any other computing system for receiving, storing, transmitting and/or displaying relevant information. Terminal 851 and/or terminal 841 may be one or more user devices. Terminals 851 and 841 may be identical to computer 801 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, and/or smartphones, multiprocessor systems, microprocessor-based systems, cloud-based systems, programmable consumer electronics, network PCs, minicomputers, mainframe computers, distributed computing environments that include any of the above systems or devices, and the like.

Figure 9:
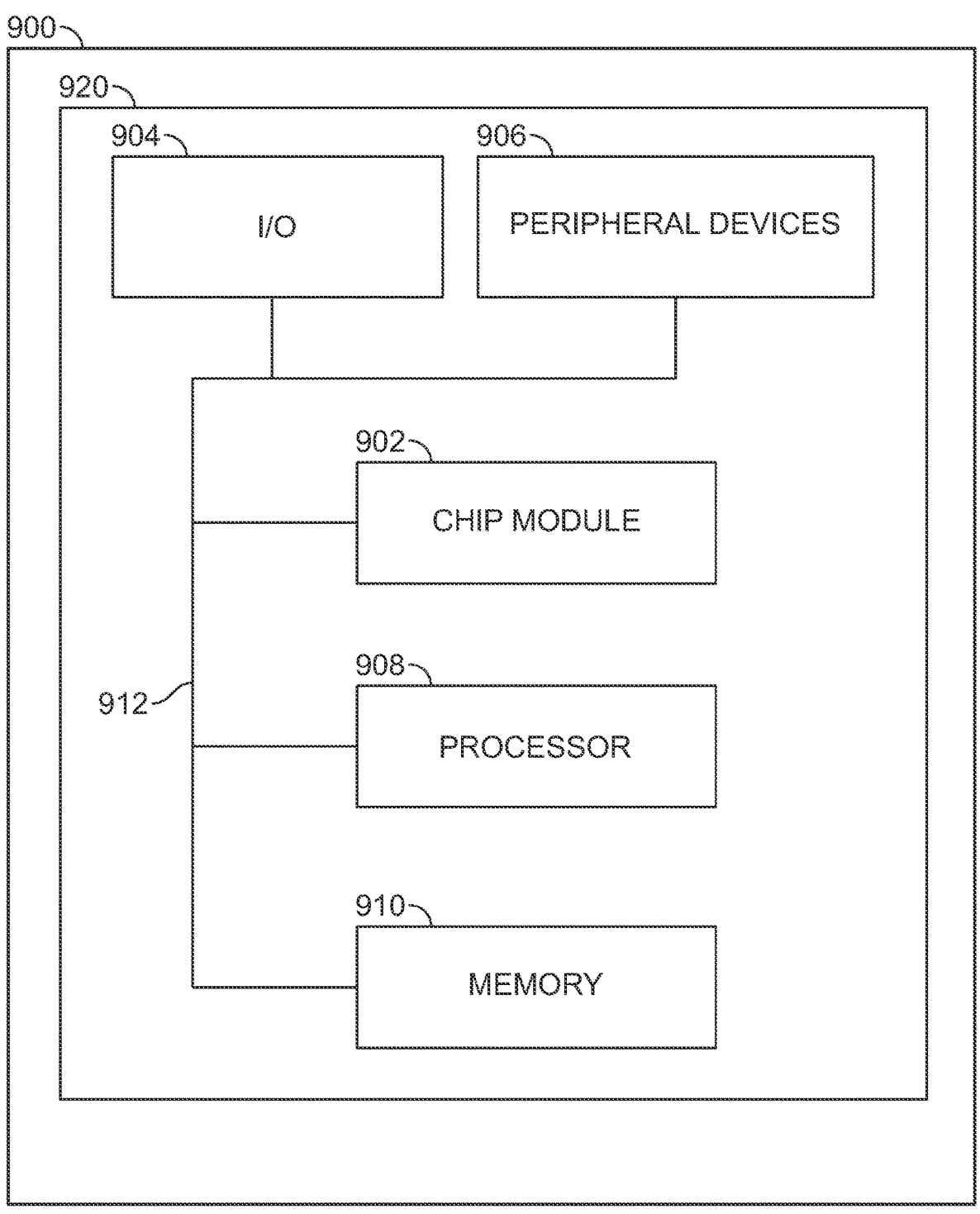
FIG. 9 shows an illustrative apparatus of a device in accordance with principles of the disclosure.

FIG. 9 shows illustrative apparatus 900, which may be a computing device. Apparatus 900 may include chip module 902, which may include one or more integrated circuits, and which may include logic configured to perform any other suitable logical operations.

Apparatus 900 may include one or more of the following components: I/O circuitry 904, which may include a transmitter device and a receiver device and may interface with fiber optic cable, coaxial cable, telephone lines, wireless devices, PHY layer hardware, a keypad/display control device or any other suitable media or devices; peripheral devices 906, which may include counter timers, real-time timers, power-on reset generators or any other suitable peripheral devices; logical processing device 908, which may compute data structural information and structural parameters of the data; and machine-readable memory 910.

Machine-readable memory 910 may be configured to store in machine-readable data structures: machine executable instructions, (which may be alternatively referred to herein as "computer instructions" or "computer code"), applications such as applications 919, signals, and/or any other suitable information or data structures.

Components 902, 904, 906, 908 and 910 may be coupled together by a system bus or other interconnections 912 and may be present on one or more circuit boards such as circuit board 920. In some embodiments, the components may be integrated into a single chip. The chip may be silicon-based.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, methods and systems for auto-healing of microservices information flow may be provided. Persons skilled in the art will appreciate that the present invention can be practiced by other than the described embodiments, which are presented for purposes of illustration rather than of limitation.

What is claimed is:

1. A method of auto-healing a microservices information flow across containers in a cloud, comprising:

receiving, at a cloud that provides computing services to a computer, an electronic cloud service request relating to an unsuccessful performance of a first request to perform an electronic transaction, the unsuccessful performance using a cloud-based application;

in response to the electronic cloud service request of the unsuccessful performance of the first request, using a generative artificial intelligence (AI) engine in the cloud to generate a solution to autonomously heal the microservices information flow and enable interaction between the computer and the cloud-based application to perform the electronic transaction; and autonomously healing the microservices information flow to enable performance of the electronic transaction using the generated solution.

2. The method of claim 1, wherein:

the cloud service request comprises one or more parameters that have been used in connection with the first request to perform the electronic transaction;

the generation of the solution by the generative AI engine comprises determining one or more additions, deletions, or changes to the one or more parameters in the first request for the electronic transaction; and the method further comprises: instituting the one or more additions, deletions or changes before initiating a second request to perform the electronic transaction.

3. The method of claim 2, wherein the one or more added, deleted, or changed parameters comprise one or more of configuration parameters, network parameters, container parameters, memory storage parameters or data caching parameters.

4. The method of claim 2, wherein:

the generative AI engine is configured to determine the one or more parameters to be added, deleted, or changed based on one or more stored predicted solution templates that have been previously implemented successfully to resolve previous problems with completing other electronic transactions caused by the microservices information flow in the cloud.

5. The method of claim 4, wherein:

the generative AI engine is configured to determine the one or more parameters to be added, deleted, or changed based on a Rules Engine Algorithm (REA) that is maintained on the cloud.

6. The method of claim 5, wherein:

the generative AI engine is configured to generate, on the fly, a solution that autonomously heals the microservices information flow over the cloud when the generative AI engine is unable to autonomously heal the microservices information flow using the one or more stored predicted solution templates.

7. The method of claim 4, wherein the one or more stored predicted solution templates are obtained from a solutions database comprising data relating to past failed customer interactions and successful solutions to the past failed customer interactions.

8. The method of claim 1, wherein multiple instances of the cloud-based application are available on the cloud and the method further comprises:

storing a predicted solution template for each of the multiple instances of the cloud-based application.

9. The method of claim 8, wherein the multiple instances of the cloud-based application are stored at two or more different data centers.

10. The method of claim 1, wherein the electronic transaction comprises an electronic banking transaction using the cloud-based application.

11. The method of claim 1, wherein the generated solution is stored in a cache in the cloud to be available for future use to generate a future solution to another failed customer interaction associated with the cloud-based application.

12. The method of claim 1, further comprising recording a record of the electronic cloud service request for which a predicted solution is required and the predicted solution that was successfully used on a distributed ledger of a blockchain.

13. The method of claim 12, wherein an entry in the distributed ledger for the electronic cloud service request and a corresponding solution for the electronic cloud service request comprises a first hash of the electronic cloud service request and a second hash of an electronic cloud service response to the electronic cloud service request.

14. The method of claim 1, further comprising transmitting the electronic cloud service request to a Lambda Handler located in the cloud to forward the electronic cloud service request and other electronic cloud service requests to the generative AI engine.

15. The method of claim 1, wherein the electronic cloud service request has been processed by a Distributed Denial of Services (DDos) protection service to block fraudulent transactions from being propagated beyond the DDos protection service.

16. The method of claim 15, wherein the electronic cloud service request has been transmitted through a multi-channel bus after being processed by the DDos protection service.

17. The method of claim 16, wherein the multi-channel bus is configured to operate a prioritization algorithm performed by second computer processor at the multi-channel bus to prioritize an order in which to process transaction requests.

18. A system in which a cloud-based application is implemented using microservices in containers, comprising:

an input to a cloud that is configured to receive an electronic cloud service request to perform an electronic transaction relating to an unsuccessful performance of a first request to perform an electronic transaction using a cloud-based application;

wherein the cloud-based application is implemented using microservices in one or more containers, and the electronic transaction was not completed because of an interruption in the microservices information flow;

a generative artificial intelligence (AI) engine in the cloud that is configured to generate a solution to autonomously heal the microservices information flow when the microservices are unable to successfully perform the requested electronic transaction by adding to, deleting from, or changing parameters associated with the first request so that the microservices are able to successfully perform the requested electronic transaction using the added, deleted, or changed parameters; and one or more computer processors in the cloud that are configured to autonomously heal the microservices information flow and perform the electronic transaction.

19. The system of claim 18, wherein:

the generative AI engine is further configured to perform the requested electronic transaction based on one or more stored predicted solution templates that have been previously used to successfully process other requested electronic transactions.

20. The system of claim 19, wherein:

the generative AI engine is further configured to generate, on the fly, a solution that autonomously heals the microservices information flow over the cloud when the generative AI engine is unable to autonomously heal the microservices information flow using only the one or more stored predicted solution templates.

* * * * *